(12) United States Patent
Gao et al.

(10) Patent No.: US 9,276,431 B2
(45) Date of Patent: Mar. 1, 2016

(54) POWER MANAGEMENT FOR ELECTRIC VEHICLES

(71) Applicant: O2Micro Inc., Santa Clara, CA (US)

(72) Inventors: Siyuan Gao, Shenzhen (CN); Wei Zhang, Shanghai (CN); Wei Zhong, Shenzhen (CN); Catalin Popovici, San Jose, CA (US)

(73) Assignee: O2MICRO INC., Santa Clara, CA (US)

( * ) Notice: Subject to any disclaimer, the term of this patent is extended or adjusted under 35 U.S.C. 154(b) by 758 days.

(21) Appl. No.: 13/692,046

(22) Filed: Dec. 3, 2012

(65) Prior Publication Data

US 2013/0093238 A1    Apr. 18, 2013

Related U.S. Application Data

(63) Continuation-in-part of application No. 12/916,443, filed on Oct. 29, 2010, now Pat. No. 8,450,976.

(51) Int. Cl.
*H02J 7/00* (2006.01)
*H02J 7/04* (2006.01)

(52) U.S. Cl.
CPC ............. *H02J 7/0072* (2013.01); *H02J 7/0031* (2013.01); *H02J 7/0078* (2013.01); *H02J 7/0083* (2013.01)

(58) Field of Classification Search
CPC ...................................................... H02J 7/0072
USPC .......................... 320/109, 136, 134, 162, 163
See application file for complete search history.

(56) References Cited

U.S. PATENT DOCUMENTS

| | | | |
|---|---|---|---|
| 6,850,039 B2 | 2/2005 | Popescu | |
| 6,977,485 B1 | 12/2005 | Wei | |
| 7,521,892 B2 | 4/2009 | Funabashi et al. | |
| 7,598,707 B2 * | 10/2009 | Yamamoto | H02J 9/061 320/128 |
| 7,750,604 B2 * | 7/2010 | Hartular | H01M 10/44 320/132 |
| 7,928,692 B2 * | 4/2011 | Carrier | H01M 2/1022 320/116 |
| 8,450,976 B2 * | 5/2013 | Lipcsei | H02J 7/0083 320/134 |
| 8,498,766 B2 | 7/2013 | Takahashi et al. | |
| 2002/0084772 A1 | 7/2002 | Ruha et al. | |

(Continued)

FOREIGN PATENT DOCUMENTS

CN    101777782 A    7/2010
CN    201594756 U    9/2010

(Continued)

OTHER PUBLICATIONS

Office Action issued Dec. 24, 2013 in Taiwan Application No. 100139119.

*Primary Examiner* — Richard V Muralidar
(74) *Attorney, Agent, or Firm* — Pillsbury Winthrop Shaw Pittman LLP

(57) ABSTRACT

An apparatus for managing power in an electric vehicle includes a control circuit and a first switch. The control circuit is configured to generate a first control signal based on a current of a battery operable for powering the electric vehicle, and to generate a second control signal based on a voltage of the battery. The first switch is configured to control connection of the battery to a power source and a load in the electric vehicle according to the first control signal. The first control signal controls a voltage at a terminal of the first switch to maintain the current of the battery to be substantially equal to a current setting, and the second control signal controls the battery to switch between a first state and a second state.

25 Claims, 7 Drawing Sheets

(56) References Cited

U.S. PATENT DOCUMENTS

| | | |
|---|---|---|
| 2007/0190369 A1 | 8/2007 | Leach et al. |
| 2009/0220825 A1 | 9/2009 | Nakashima et al. |
| 2010/0176764 A1 | 7/2010 | Tachikawa et al. |

FOREIGN PATENT DOCUMENTS

| | | |
|---|---|---|
| CN | 201639320 U | 11/2010 |
| CN | 102470771 A | 5/2012 |
| JP | 2003180040 A | 6/2003 |
| JP | 2006281404 A | 10/2006 |
| JP | 2007-236033 A | 9/2007 |
| JP | 2008182809 A | 8/2008 |
| JP | 2010-016975 A | 1/2010 |
| TW | I233228 B | 5/2005 |
| TW | I246215 B | 12/2005 |
| TW | M292169 U | 6/2006 |
| TW | I289369 B | 11/2007 |
| TW | I328913 B | 8/2010 |

\* cited by examiner

POWER MANAGEMENT FOR ELECTRIC VEHICLES

RELATED APPLICATIONS

This application is a continuation-in-part of U.S. patent application Ser. No. 12/916,443, filed on Oct. 29, 2010, which is hereby incorporated by reference in its entirety.

FIELD

The present teaching relates to an apparatus and method for power management. Particularly, the present teaching is directed to an apparatus and method for managing power in electric vehicles.

BACKGROUND

FIG. 1 shows a schematic diagram of a conventional power system 100 for an electric vehicle. The power system 100 includes a direct-current to direct-current (DC/DC) converter 106 and a rechargeable battery 104, and is used to power electrical equipment 102 in the electric vehicle. As shown in FIG. 1, the electrical equipment 102 is coupled to the DC/DC converter 106 and the battery 104 via a power input terminal 120, and is powered by the DC/DC converter 106 and/or the battery 104. Additionally, the DC/DC converter 106 may charge the battery 104.

The power system 100 may be problematic. By way of example, the electrical equipment 102 has a start-up threshold voltage, and does not operate if the voltage at the power input terminal 120 of the electrical equipment 102 is less than the start-up threshold voltage. Thus, if the voltage of the battery 104, e.g., provided as the voltage at the power input terminal 120, is less than the start-up threshold voltage, the DC/DC converter 106 will supply power only to the battery 104. The electrical equipment 102 is inactive until the battery 104 is charged to have a voltage greater than the start-up threshold voltage. Consequently, the power system 100 may take a relatively long time to start the electrical equipment 102.

Additionally, the DC/DC converter 106 may be plugged into the electric vehicle when the battery 104 is already well charged, and the voltage of the battery 104 may be greater than the output voltage VOUT of the DC/DC converter 106. A reversed current $I_R$ may flow from the battery 104 to the DC/DC converter 106, causing damage to the DC/DC converter 106.

Moreover, if the battery 104 is in an under-voltage condition, the battery 104 should be charged by a trickle current having a relatively small current level to avoid being damaged. However, the power system 100 does not provide such protection. That is, when the battery 104 is in the under-voltage condition, the DC/DC converter 106 may provide a charging current that is high enough to damage the battery 104.

SUMMARY

In one embodiment, an apparatus for managing power in an electric vehicle includes a control circuit and a first switch. The control circuit is configured to generate a first control signal based on a current of a battery operable for powering the electric vehicle, and to generate a second control signal based on a voltage of the battery. The first switch is coupled to the control circuit and is configured to control connection of the battery to a power source and a load in the electric vehicle according to the first control signal. The first control signal controls a voltage at a terminal of the first switch to maintain the current of the battery to be substantially equal to a current setting, and the second control signal controls the battery to switch between a first state and a second state.

In another embodiment, an electric vehicle includes a load, a control circuit and a first switch. The load is configured to receive power from a power source or a battery. The control circuit is coupled to the load and is configured to manage the power by using a first control signal and a second control signal, the first control signal being generated by the control circuit based on a current of the battery, the second control signal being generated by the control circuit based on a voltage of the battery. The first switch is coupled to the control circuit and is configured to control connection of the battery to the power source and the load according to the first control signal. The first control signal controls a voltage at a terminal of the first switch to maintain the current of the battery to be substantially equal to a current setting, and the second control signal controls the battery to switch between a first state and a second state.

In still another embodiment, a method for managing power in an electric vehicle is provided. A first control signal is generated based on a current of a battery operable for powering the electric vehicle. A second control signal is generated based on a voltage of the battery. Using a control circuit, connection of the battery to a power source and a load in the electric vehicle is controlled by controlling a switch based on the first control signal. The current of the battery is maintained to be substantially equal to a current setting by controlling a voltage at a terminal of the switch according to the first control signal. The battery is controlled to switch between a first state and a second state according to the second control signal.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present teaching. While the teaching will be described in conjunction with these embodiments, it will be understood that they are not intended to limit the teaching to these embodiments. On the contrary, the teaching is intended to cover alternatives, modifications and equivalents, which may be included within the spirit and scope of the teaching as defined by the appended claims.

Furthermore, in the following detailed description of the present teaching, numerous specific details are set forth in order to provide a thorough understanding of the present teaching. However, it will be recognized by one of ordinary skill in the art that the present teaching may be practiced without these specific details. In other instances, well known methods, procedures, components, and circuits have not been described in detail as not to unnecessarily obscure aspects of the present teaching.

In one embodiment, the present teaching provides a power management apparatus that manages power for an electric vehicle such as an electric car, an electric bike, or an electric bus. The electric vehicle may be powered by a DC/DC converter (e.g., a charger) and a rechargeable battery. The DC/DC converter may charge the rechargeable battery. By using the power management apparatus of the present teaching, when the power from the DC/DC converter is available, electrical equipment in the electric vehicle may operate even when the voltage of the battery is relatively low. The power management apparatus may also protect the DC/DC converter from a reverse current flowing from the battery when the DC/DC converter is plugged into the electric vehicle. Additionally, the power management apparatus may protect the battery from an excessive charging current.

Figure 1:
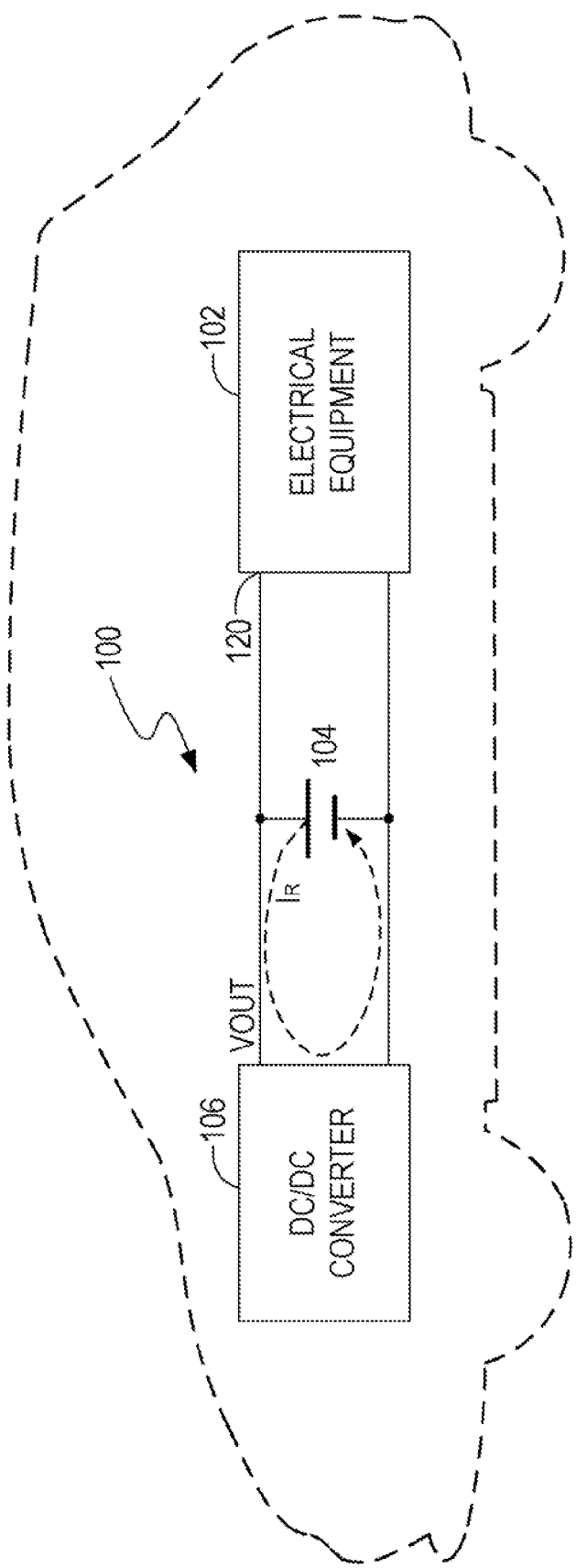
FIG. 1 shows a schematic diagram of a conventional power system for an electric vehicle.
Figure 2:
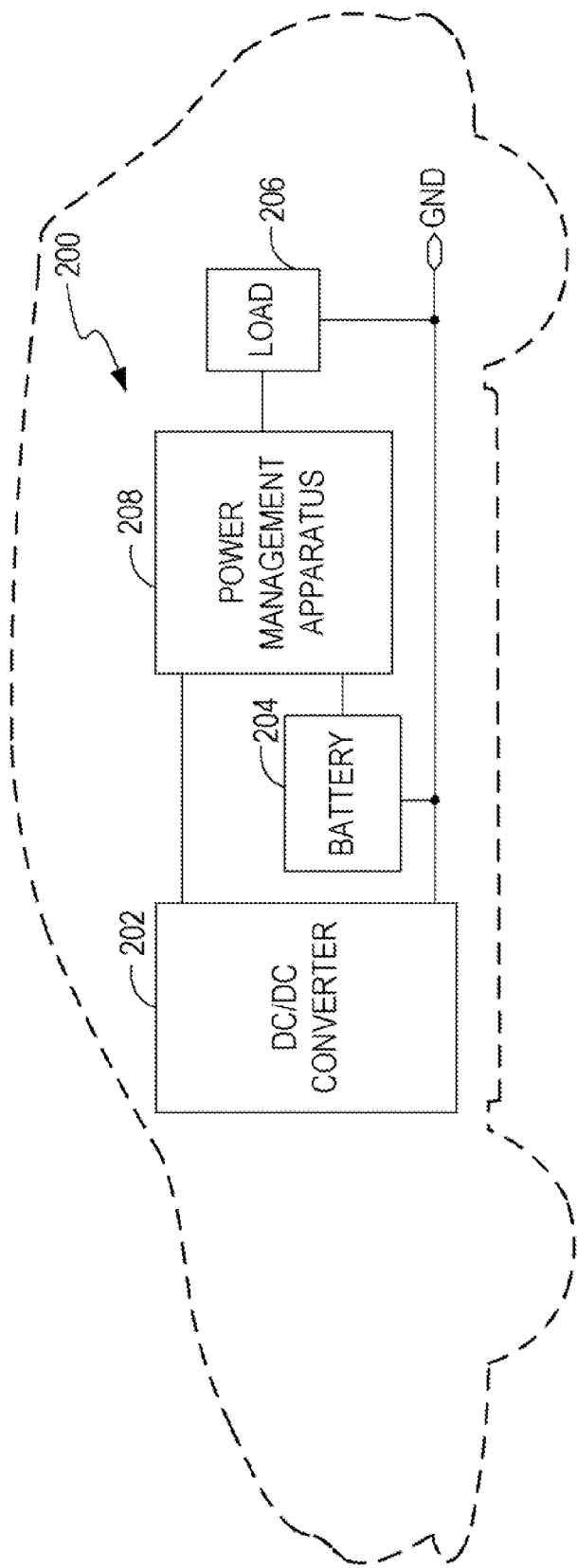
FIG. 2 illustrates a block diagram of an example of a power system for an electric vehicle, in accordance with one embodiment of the present teaching.

FIG. 2 illustrates a block diagram of an example of a power system 200 for an electric vehicle, in accordance with one embodiment of the present teaching. The power system 200 includes a DC/DC converter 202, a battery 204, and a power management apparatus 208. The power system 200 provides power to a load 206, e.g., electric equipment such as power seats, windows, door locks, entertainment equipment, navigation equipment, or any other suitable vehicle equipment in the electric vehicle. The battery 204 may be a rechargeable battery such as lead-acid battery, lithium-ion battery, nickel-cadmium battery, nickel-metal hydride battery, etc. The battery 204, the load 206, and the DC/DC converter 202 are coupled to one another via the power management apparatus 208. The DC/DC converter 202, e.g., a charger, is configured to power the load 206 and charge the battery 204. The battery 204 may power the load 206 when the power from the DC/DC converter 202 is not available.

Figure 3:
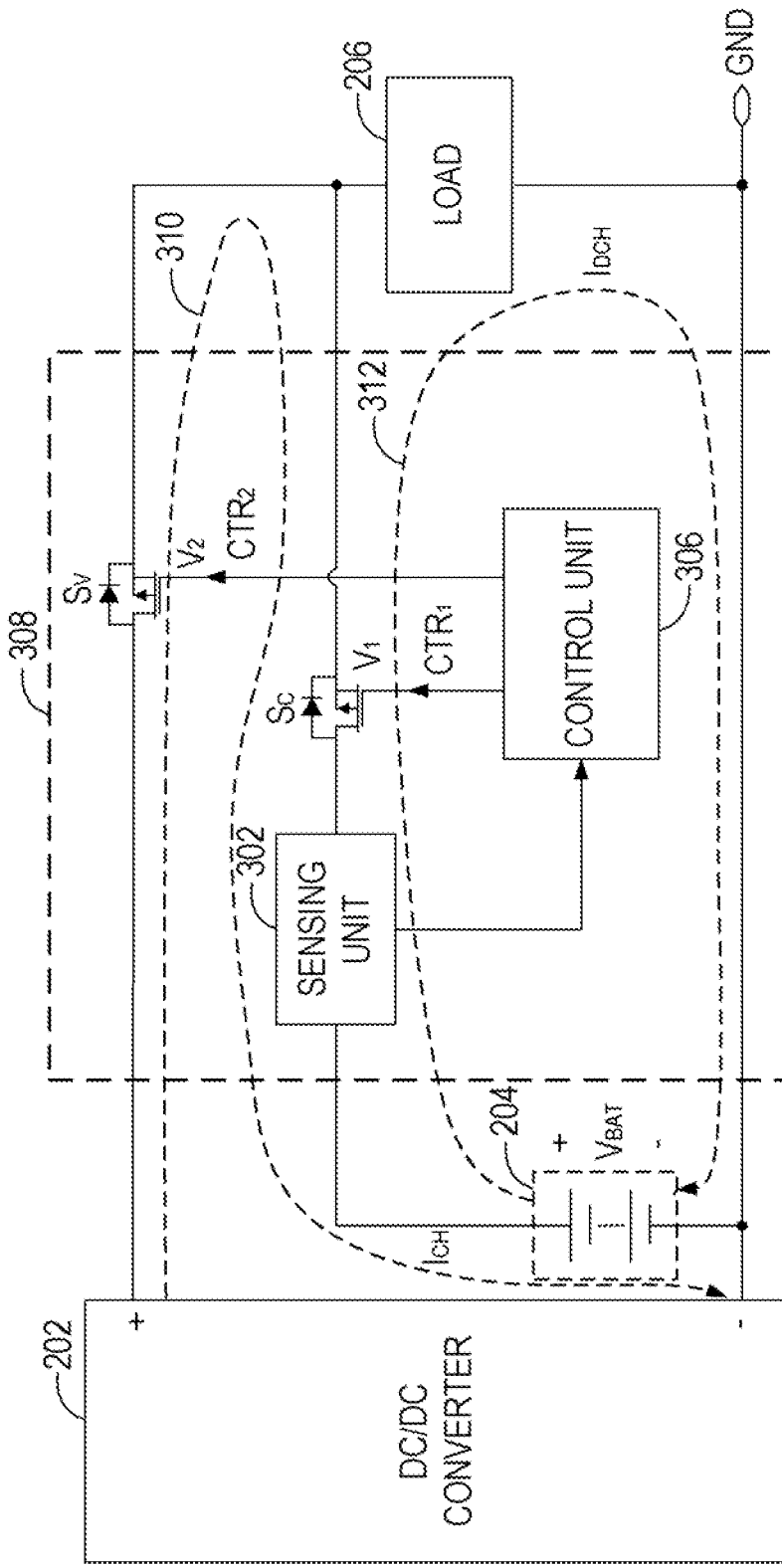
FIG. 3 illustrates a circuit diagram of an example of a power management apparatus for an electric vehicle, in accordance with one embodiment of the present teaching.

FIG. 3 illustrates a circuit diagram of an example of a power management apparatus 308 for an electric vehicle, in accordance with one embodiment of the present teaching. FIG. 3 is described in combination with FIG. 2, and elements that are labeled the same as in FIG. 2 have similar functions. The power management apparatus 308 is one embodiment of the power management apparatus 208 in FIG. 2. The power management apparatus 308 includes a sensing unit 302, a control unit 306, and switches $S_C$ and $S_V$.

In this example, the sensing unit 302 is configured to detect a charging current $I_{CH}$ and a battery voltage $V_{BAT}$ of the battery 204 which is used for powering the electric vehicle. The control unit 306, coupled to the sensing unit 302, is configured to generate a first control signal $CTR_1$ based on the charging current $I_{CH}$ and generate a second control signal $CTR_2$ based on the battery voltage $V_{BAT}$. The switches $S_C$ and $S_V$ are coupled to the sensing unit 302 and the control unit 306. The switch $S_C$ is configured to control connection of the battery 204 to the DC/DC converter 202 and the load 206 according to the first control signal $CTR_1$, and the switch $S_V$, coupled to the switch $S_C$, is configured to control connection of the DC/DC converter 202 to the battery 204 and the load 206 according to the second control signal $CTR_2$. The DC/DC converter 202 is configured to charge the battery 204 and provide power to the load 206.

In the embodiment of FIG. 3, the first control signal $CTR_1$ controls a first voltage $V_1$ at a terminal of the switch $S_C$, and the second control signal $CTR_2$ controls a second voltage $V_2$ at a terminal of the switch $S_V$. By way of example, the switch $S_C$ is a transistor, e.g., an insulated gate bipolar transistor (IGBT) or a metal-oxide-semiconductor field-effect transistor (MOSFET), and the first voltage $V_1$ at the gate (hereinafter, the gate voltage $V_1$) of the switch $S_C$ is controlled by the first control signal $CTR_1$ such that the state of the switch $S_C$ is controlled by the first control signal $CTR_1$. The switch $S_V$ may be any kind of a switch such as an IGBT, a MOSFET, or a relay. In the example of FIG. 3, the switch $S_V$ is a MOSFET, and the second voltage $V_2$ at the gate (hereinafter, the gate voltage $V_2$) of the switch $S_V$ is controlled by the second control signal $CTR_2$, such that the state of the switch $S_V$ is controlled by the second control signal $CTR_2$.

For example, in one embodiment, when the DC/DC converter 202 is charging the battery 204, the power management apparatus 308 provides the first control signal $CTR_1$ to control the gate voltage $V_1$, so as to adjust the conduction of the switch $S_C$ to maintain the charging current $I_{CH}$ to be at or near a predetermined level, e.g., a level of a charging current setting $I_{CSET}$. In the example of FIG. 3, the switch $S_C$ is a p-channel MOSFET. If the charging current $I_{CH}$ is greater than the charging current setting $I_{CSET}$, the first control signal $CTR_1$ increases the gate voltage $V_1$ of the switch $S_C$ to reduce the conduction of the switch $S_C$, so that the charging current $I_{CH}$ decreases accordingly. If the charging current $I_{CH}$ is less than the charging current setting $I_{CSET}$, then the first control signal $CTR_1$ decreases the gate voltage $V_1$ of the switch $S_C$ to raise the conduction of the switch $S_C$, such that the charging current $I_{CH}$ increases accordingly. In this manner, by controlling the conduction of the switch $S_C$, the charging current $I_{CH}$ may be maintained to be substantially equal to the charging current setting $I_{CSET}$, which prevents excessive charging current to damage the charging battery 204. As used herein, "at or near" and "substantially equal to" means the charging current $I_{CH}$ and the charging current setting $I_{CSET}$ may have a difference caused by, e.g., non-ideality of circuit components, as long as the difference is within a range that may be neglected.

In one embodiment, the second control signal $CTR_2$ controls the gate voltage $V_2$ of the switch $S_V$ so that the battery 204 is controlled to operate in a first state, e.g., a charging state CH, or a second state, e.g., a discharging state DCH.

In one embodiment, the battery 204 may operate in the charging state CH when the battery 204 is not full-charged, and power from the DC/DC converter 202 is available for the battery 204 and the load 206, e.g., the DC/DC converter 202 or a charger is plugged to the electric vehicle and connected to the battery 204 and the load 206. In the charging state CH, the switches $S_V$ and $S_C$ are turned on. The DC/DC converter 202 provides a charging current $I_{CH}$, e.g., maintained at the level of charging current setting $I_{CSET}$, to the battery 204. The charging current $I_{CH}$ flows from the DC/DC converter 202, through the switch $S_C$, to the battery 204 via a battery charge path 310 as shown in FIG. 3. The DC/DC converter 202 may also provide power to the load 206, and it may keep charging the battery 204 until the battery 204 is fully charged. In one embodiment, if the voltage of the battery 204 is less than a start-up voltage threshold of the load 206, e.g., equipment in the electric vehicle, the load 206 may operate while the battery 204 is being charged. Additionally, in one embodiment, if the battery 204 is in an under-voltage condition, the battery 204 may be charged by a current maintained at a set level, e.g., a relatively low level. In this way, the battery 204 is protected.

In another embodiment, the battery 204 may operate in the discharging state DCH when power from the DC/DC converter 202 is not available, e.g., the DC/DC converter 202 or the charger is unplugged from the electric vehicle. In the discharging state DCH, the switch $S_V$ is turned off, and the switch $S_C$ is turned on. The discharging current $I_{DCH}$ flows from the battery 204, through the switch $S_C$, to the load 206 via a battery discharge path 312 as shown in FIG. 3. The battery 204 may supply power to the load 206 in the discharging state DCH.

In yet another embodiment, the battery 204 may also operate in the discharging state DCH if the control unit 306 detects that the battery voltage $V_{BAT}$ is greater than the output voltage of the DC/DC converter 202, e.g., when the DC/DC converter 202 having an output voltage that is smaller than the battery voltage $V_{BAT}$ is plugged to the electric vehicle. In this case, the second control signal $CTR_2$ controls the switch $S_V$ to disconnect the DC/DC converter 202 from the battery 204 and the load 206, thus a reverse current flowing from the battery 204 to the DC/DC converter 202 is prevented. During the discharging state DCH, the battery voltage $V_{BAT}$ decreases. When the battery voltage $V_{BAT}$ decreases to be less than the output voltage of the DC/DC converter 202, the battery 204 may operate in the charging state CH when the second control signal $CTR_2$ controls the switch $S_V$ to connect the DC/DC converter 202 to the battery 204 and the load 206 again.

Figure 4:
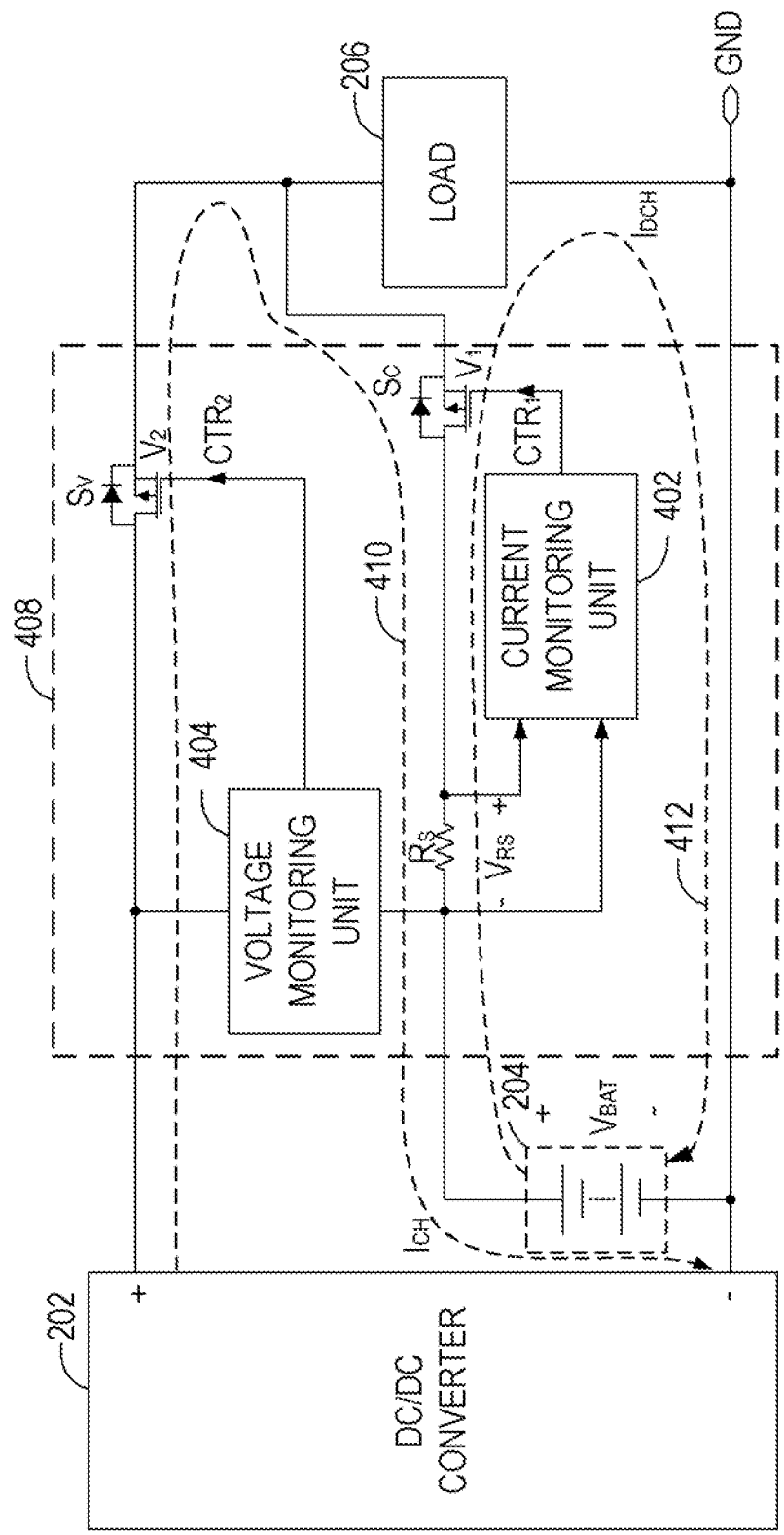
FIG. 4 illustrates a circuit diagram of an example of a power management apparatus for an electric vehicle, in accordance with one embodiment of the present teaching.

FIG. 4 illustrates a circuit diagram of an example of a power management apparatus 408 for an electric vehicle, in accordance with one embodiment of the present teaching. FIG. 4 is described in combination with FIG. 2 and FIG. 3, and elements that are labeled the same as in FIG. 2 and FIG. 3 have similar functions. The power management apparatus 408 is another embodiment of the power management apparatus 208 in FIG. 2. The power management apparatus 408 includes a sensing resistor $R_S$, a current monitoring unit 402, a voltage monitoring unit 404, and the switches $S_C$ and $S_V$. In one embodiment, the control unit 306 in FIG. 3 includes the current monitoring unit 402 and the voltage monitoring unit 404 in FIG. 4. The sensing resistor $R_S$ is coupled to the battery 204 and the current monitoring unit 402. The sensing resistor $R_S$ is configured to detect the charging current $I_{CH}$ and provide a signal, e.g., a voltage $V_{RS}$ across the sensing resistor $R_S$, representing the charging current $I_{CH}$ to the current monitoring unit 402. The current monitoring unit 402, coupled to the switch $S_C$, is configured to detect the charging current $I_{CH}$ by receiving the voltage $V_{RS}$ across the sensing resistor $R_S$ and generate the first control signal $CTR_1$ to control the switch $S_C$. The voltage monitoring unit 404, coupled to the battery 204 and the switch $S_V$, is configured to receive the battery voltage $V_{BAT}$ and generate the second control signal $CTR_2$ to control the switch $S_V$. The controlling of the switches $S_C$ and $S_V$ is similar as mentioned in FIG. 3, thus detailed description is omitted here for simplicity.

Figure 5:
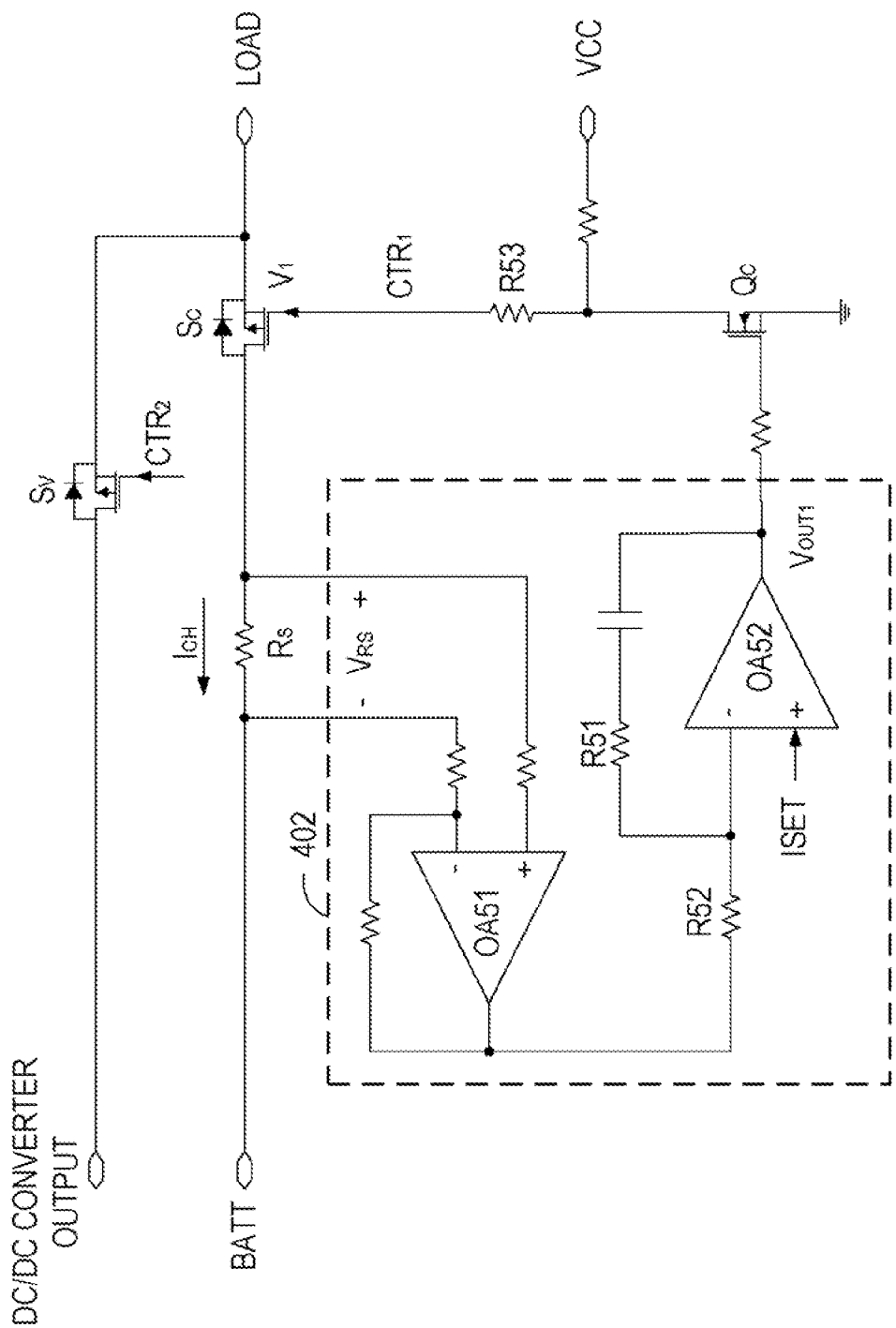
FIG. 5 illustrates a circuit diagram of an example of the current monitoring unit in FIG. 4, in accordance with one embodiment of the present teaching.

FIG. 5 illustrates a circuit diagram of an example of the current monitoring unit 402 in FIG. 4, in accordance with one embodiment of the present teaching. FIG. 5 is described in combination with FIG. 4, and elements that are labeled the same as in FIG. 4 have similar functions. The current monitoring unit 402 in this example includes operational amplifiers OA51 and OA52 and a set of resistors. The current monitoring unit 402 is configured to compare the charging current $I_{CH}$ of the battery 204 with the charging current setting $I_{CSET}$ to generate the first control signal $CTR_1$. The two input terminals of the operational amplifier OA51 are coupled respectively to the two terminals of the sensing resistor $R_S$. The output terminal of the operational amplifier OA51 provides a sensing signal, e.g., a voltage, to represent the charging current $I_{CH}$ of the battery 204. The operational amplifier OA52, coupled to the switch $S_C$ via a transistor $Q_C$ and a resistor R53, is configured to receive the sensing signal representative of the charging current $I_{CH}$ at its inverting input terminal via a resistor R52, and receive a reference signal ISET, e.g., a voltage, representative of the charging current setting $I_{CSET}$ at its non-inverting input terminal. The operational amplifier OA52 further provides an output signal $V_{OUT1}$ to control the conduction of the switch $S_C$ via the transistor $Q_C$ and the resistor R53. Specifically, if the charging current $I_{CH}$ is greater than the charging current setting $I_{CSET}$, then the current monitoring unit 402 adjusts (e.g. decreases) a gate voltage of the transistor $Q_C$ to adjust (e.g., increase) the gate voltage $V_1$ of the switch $S_C$, so as to reduce the charging current $I_{CH}$ of the battery 204. In a similar manner, the charging current $I_{CH}$ may be increased if it is less than the charging current setting $I_{CSET}$. As a result, the current monitoring unit 402 may maintain the charging current $I_{CH}$ at or near the charging current setting $I_{CSET}$.

Figure 6:
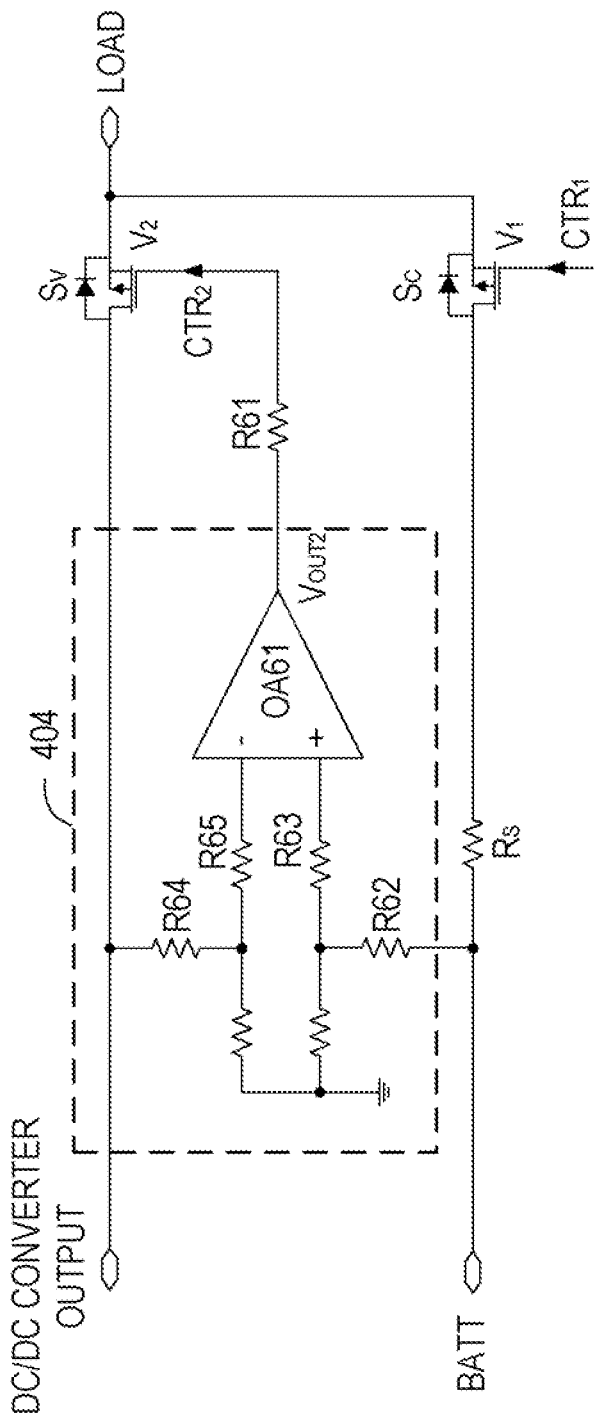
FIG. 6 illustrates a circuit diagram of an example of the voltage monitoring unit in FIG. 4, in accordance with one embodiment of the present teaching.

FIG. 6 illustrates a circuit diagram of an example of the voltage monitoring unit 404 in FIG. 4, in accordance with one embodiment of the present teaching. FIG. 6 is described in combination with FIG. 4, and elements that are labeled the same as in FIG. 4 have similar functions. The voltage monitoring unit 404 includes an operational amplifier OA61, e.g., a comparator, and a set of resistors. The operational amplifier OA61, coupled to the switch $S_V$ via a resistor R61, is configured to detect the battery voltage $V_{BAT}$ at its non-inverting input terminal via a resistor R62 and a resistor R63, and receive an output voltage of the DC/DC converter 202 at its inverting input terminal via a resistor R64 and a resistor R65. The operational amplifier OA61 further compares the battery voltage $V_{BAT}$ and the output voltage of the DC/DC converter 202 to provide an output signal $V_{OUT2}$, and to further provide the second control signal $CTR_2$ to control the state of the switch $S_V$ via the resistor R61. Specifically, if the battery voltage $V_{BAT}$ is greater than the output voltage of the DC/DC converter 202, then the second control signal $CTR_2$ turns off the switch $S_V$ to disconnect the DC/DC converter 202 from the battery 204 and the load 206. Thus, the battery 204 is discharged and provides power to the load 206. If the battery voltage $V_{BAT}$ decreases to be less than the output voltage of the DC/DC converter 202, the second control signal $CTR_2$ turns on the switch $S_V$ to reconnect the DC/DC converter 202 to the battery 204 and the load 206. In this manner, the voltage monitoring unit 404 may protect the DC/DC converter 202 from the damage causing by a reverse current flowing from the battery 204.

Figure 7:
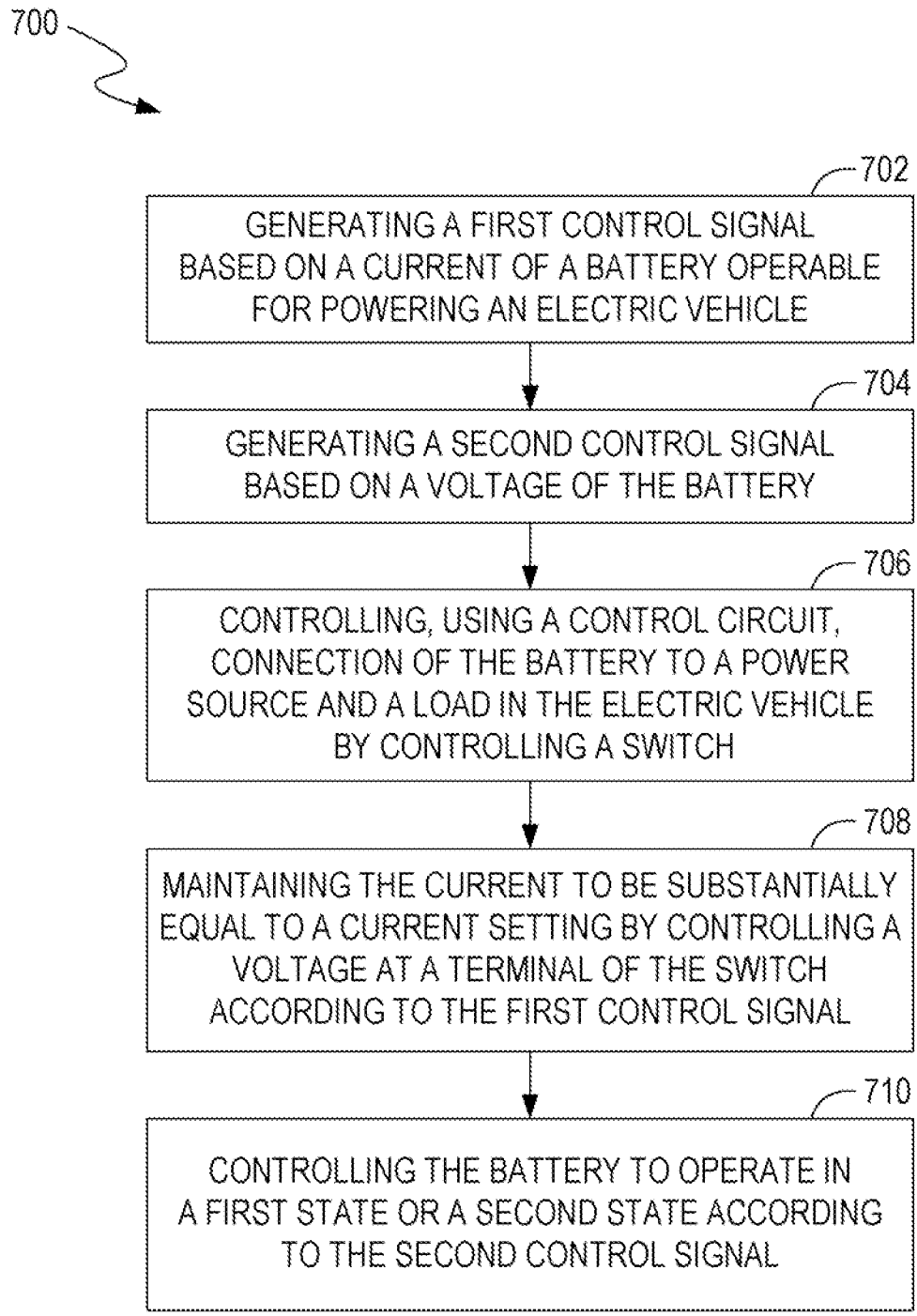
FIG. 7 illustrates a flowchart of examples of operations performed by a power management apparatus, in accordance with one embodiment of the present teaching.

FIG. 7 illustrates a flowchart 700 of examples of operations performed by a power management apparatus (e.g., the apparatus 208 in FIG. 2, the apparatus 308 in FIG. 3, or the apparatus 408 in FIG. 4), in accordance with one embodiment of the present teaching. FIG. 7 is described in combination with FIG. 2, FIG. 3, FIG. 4, FIG. 5 and FIG. 6.

In block 702, a first control signal, e.g., the signal $CTR_1$, is generated, e.g., by the control unit 306 in FIG. 3, or the current monitoring unit 402 in FIG. 4 or FIG. 5. The first control signal is generated based on a current, e.g., the charging current $I_{CH}$, of a battery 204 to control a state of a switch $S_C$, e.g., an IGBT or a MOSFET, coupled in series to the battery 204. The battery 204 is configured to power an electric vehicle.

In block 704, a second control signal, e.g., the signal $CTR_2$, is generated, e.g., by the control unit 306 in FIG. 3, or the voltage monitoring unit 404 in FIG. 4 or FIG. 6. The second control signal is generated based on a battery voltage $V_{BAT}$ of the battery 204 to control a state of a switch $S_V$.

In block 706, the first control signal controls the switch $S_C$ to control connection of the battery 204 to a power source, e.g., the DC/DC converter 202, and to a load, e.g., the load 206 included in the electric vehicle as shown in FIG. 3 and FIG. 4. The connection is controlled by controlling a voltage at a terminal (e.g., the gate voltage $V_1$) of the switch $S_C$.

In block 708, by controlling the gate voltage of the switch $S_C$ according to the first control signal, the current is maintained to be substantially equal to a current setting, e.g., the charging current setting $I_{CSET}$.

In block 710, by controlling the switch $S_V$ according to the second control signal, the battery is controlled to operate in a first state e.g., a charging state or a second state, e.g. a discharging state.

While the foregoing description and drawings represent embodiments of the present teaching, it will be understood that various additions, modifications and substitutions may be made therein without departing from the spirit and scope of the principles of the present teaching as defined in the accompanying claims. One skilled in the art will appreciate that the teaching may be used with many modifications of form, structure, arrangement, proportions, materials, elements, and components and otherwise, used in the practice of the teaching, which are particularly adapted to specific environments and operative requirements without departing from the principles of the present teaching. The presently disclosed embodiments are therefore to be considered in all respects as illustrative and not restrictive, the scope of the teaching being indicated by the appended claims and their legal equivalents, and not limited to the foregoing description.

We claim:

1. An apparatus for managing power in an electric vehicle, comprising;
   a control circuit configured to generate a first control signal based on a current of a battery operable for powering said electric vehicle, and generate a second control signal based on a voltage of said battery; and
   a first switch, coupled to said control circuit, configured to control connection of said battery to a power source and a load in said electric vehicle according to said first control signal,
   wherein said first control signal controls a voltage at a terminal of said first switch to maintain said current of said battery to be substantially equal to a current setting, and wherein said second control signal controls said battery to switch between a first state and a second state.

2. The apparatus as claimed in claim 1, wherein
   said first switch comprises a transistor, and
   a voltage at a gate of said transistor is controlled by said first control signal.

3. The apparatus as claimed in claim 1, wherein if said current is greater than said current setting, said first control signal controls said voltage at said terminal of said first switch to adjust the conduction of said first switch.

4. The apparatus as claimed in claim 1, wherein said first state is a charging state and said second state is a discharging state.

5. The apparatus as claimed in claim 4, wherein
   if said voltage of said battery is less than a start-up voltage threshold of said load, then said second control signal controls said battery to operate in said charging state, and
   in said charging state, said power source provides said current to charge said battery via said first switch and provides power to said load.

6. The apparatus as claimed in claim 4, wherein
   if said voltage of said battery is greater than an output voltage of said power source, said second control signal controls said battery to operate in said discharging state, and
   in said discharging state, a discharging current flows from said battery through said first switch to said load.

7. The apparatus as claimed in claim 1, further comprising a second switch, coupled to said first switch and said control circuit, configured to control connection of said power source to said battery and said load based on said second control signal.

8. The apparatus as claimed in claim 7, wherein said second control signal controls said second switch to connect said power source to said battery and said load if said voltage of said battery is less than an output voltage of said power source.

9. The apparatus as claimed in claim 7, wherein said second control signal controls said second switch to disconnect said power source from said battery and said load if said voltage of said battery is greater than an output voltage of said power source.

10. The apparatus as claimed in claim 4, wherein
    said power source provides power to said battery and said load in said charging state, and
    said battery provides power to said load in said discharging state.

11. An electric vehicle comprising:
    a load configured to receive power from a power source or a battery;
    a control circuit, coupled to said load, configured to manage said power by using a first control signal and a second control signal, said first control signal being generated by said control circuit based on a current of said battery, said second control signal being generated by said control circuit based on a voltage of said battery; and
    a first switch, coupled to said control circuit, configured to control connection of said battery to said power source and said load according to said first control signal,
    wherein said first control signal controls a voltage at a terminal of said first switch to maintain said current of said battery to be substantially equal to a current setting, and said second control signal controls said battery to switch between a first state and a second state.

12. The electric vehicle as claimed in claim 11, wherein
    said first switch comprises a transistor, and
    a voltage at a gate of said transistor is controlled by said first control signal.

13. The electric vehicle as claimed in claim 11, wherein said control circuit comprises a current monitoring unit, coupled to said first switch, configured to detect said current of said battery and generate said first control signal to control said first switch.

14. The electric vehicle as claimed in claim 13, wherein said current monitoring unit compares said current of said battery with said current setting and generates said first control signal based on the comparison to maintain said current to be substantially equal to said current setting.

15. The electric vehicle as claimed in claim 11, wherein said first state is a charging state and said second state is a discharging state.

16. The electric vehicle as claimed in claim 11 further comprising a second switch, coupled to said first switch and said control circuit, configured to control connection of said power source to said battery and said load based on said second control signal.

17. The electric vehicle as claimed in claim 16, wherein said control circuit comprises a voltage monitor unit, coupled to said second switch, configured to detect said voltage of said battery and generate said second control signal to control said second switch.

18. The electric vehicle as claimed in claim 15, wherein
if said voltage of said battery is less than a start-up voltage threshold of said load, then said second control signal controls said battery to operate in said charging state, and said power source provides said current to charge said battery via said first switch and provides power to said load; and
if said voltage of said battery is greater than an output voltage of said power source, then said second control signal controls said battery to operate in said discharging state, and said battery provides power via said first switch to said load.

19. The electric vehicle as claimed in claim 15, wherein
said power source provides power to said battery and said load in said charging state, and
said battery provides power to said load in said discharging state.

20. A method for managing power in an electric vehicle, said method comprising:
generating a first control signal based on a current of a battery operable for powering said electric vehicle;
generating a second control signal based on a voltage of said battery;
controlling, using a control circuit, connection of said battery to a power source and a load in said electric vehicle by controlling a switch based on said first control signal;
maintaining said current of said battery to be substantially equal to a current setting by controlling a voltage at a terminal of said switch according to said first control signal; and controlling said battery to switch between a first state and a second state according to said second control signal.

21. The method as claimed in claim 20, wherein
said switch comprises a transistor; and
said controlling of said connection comprises controlling a voltage at a gate of said transistor according to said first control signal.

22. The method as claimed in claim 20, wherein said first state is a charging state and said second state is a discharging state.

23. The method as claimed in claim 22, further comprising controlling connection of said power source to said battery and said load based on said second control signal to control said battery to switch between said charging state and said discharging state.

24. The method as claimed in claim 20, wherein said maintaining comprises adjusting the conduction of said switch if said current is greater than said current setting.

25. The method as claimed in claim 23, wherein said controlling of said battery to switch between said charging state and said discharging state comprises:
controlling said battery to operate in said charging state if said voltage of said battery is less than a start-up voltage threshold of said load, wherein in said charging state, said power source provides said current to charge said battery via said first switch and provides power to said load; and
controlling said battery to operate in said discharging state if said voltage of said battery is greater than an output voltage of said power source, wherein in said discharging state, said battery provides power to said load and a discharging current flows from said battery through said switch to said load.

* * * * *